United States Patent
Vasudevan et al.

(10) Patent No.: US 10,817,805 B2
(45) Date of Patent: Oct. 27, 2020

(54) LEARNING DATA AUGMENTATION POLICIES

(71) Applicant: Google LLC, Mountain View, CA (US)

(72) Inventors: Vijay Vasudevan, Los Altos Hills, CA (US); Barret Zoph, Sunnyvale, CA (US); Ekin Dogus Cubuk, Sunnyvale, CA (US); Quoc V. Le, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/417,133

(22) Filed: May 20, 2019

(65) Prior Publication Data

US 2019/0354895 A1    Nov. 21, 2019

Related U.S. Application Data

(60) Provisional application No. 62/673,777, filed on May 18, 2018.

(51) Int. Cl.
*G06N 20/00* (2019.01)

(52) U.S. Cl.
CPC .................... *G06N 20/00* (2019.01)

(58) Field of Classification Search
CPC ........ G06N 20/00; G06N 7/005; G06K 9/723; G06K 9/00677; G06K 9/72; G06K 9/66; G06K 9/62; G06K 9/32; G06K 9/46
See application file for complete search history.

(56) References Cited

PUBLICATIONS

Ratner, "Learning to Compose Domain-Specific Transformations for Data Augmentation" NIPS 2017 (Year: 2017).*
Bengio, "Scheduled Sampling for Sequence Prediction with Recurrent Neural Networks", NIPS 2015 (Year: 2015).*
Suganuma, "A Genetic Programming Approach to Designing Convolutional Neural Network Architectures", Cornell University (Year: 2017).*
Wang, "The Effectiveness of Data Augmentation in Image Classification using Deep Learning", 2017 (Year: 2017).*
Ratner, "Learning to Compose DOmain-Specific Transformation for Data Augmentation", NIPS, 2017 (Year: 2017).*

(Continued)

*Primary Examiner* — Ann J Lo
*Assistant Examiner* — Van C Mang
(74) *Attorney, Agent, or Firm* — Fish & Richardson P.C.

(57) ABSTRACT

Methods, systems, and apparatus, including computer programs encoded on a computer storage medium, for learning a data augmentation policy for training a machine learning model. In one aspect, a method includes: receiving training data for training a machine learning model to perform a particular machine learning task; determining multiple data augmentation policies, comprising, at each of multiple time steps: generating a current data augmentation policy based on quality measures of data augmentation policies generated at previous time steps; training a machine learning model on the training data using the current data augmentation policy; and determining a quality measure of the current data augmentation policy using the machine learning model after it has been trained using the current data augmentation policy; and selecting a final data augmentation policy based on the quality measures of the determined data augmentation policies.

18 Claims, 6 Drawing Sheets

(56) References Cited

PUBLICATIONS

Suganuma, "A Genetic Programming Approach to Designing Convolutional Neural Network Architectures", Cornell University, 2017 (Year: 2017).*
Bengio, "Scheduled Sampling for Sequence Prediction with Recurrent Neural Networks", 2015 (Year: 2015).*
Abadi et al, "Tensorflow: A system for large-scale machine learning," In Proceeding of the 12th USENIX Conference, Nov. 2016, 21 pages.
Antoniou et al, "Data augmentation generative adversarial networks," arXiv, Mar. 21, 2018, 14 pages.
Bai et al, "Incorporating intra-class variance to fine-grained visual recognition," IEEE Xplore, arXiv, Mar. 1, 2017, 6 pages.
Baker et al, Designing neural network architectures using reinforcement learning, ICLR, arXiv, Mar. 22, 2017, 18 pages.
Bello et al, "Neural optimizer search with reinforcement learning," ICML, arXiv, Sep. 22, 2017, 12 pages.
Bergstra et al, "Random search for hyperparameter optimization," Journal of Machine Learning Research, Feb. 2012, 25 pages.
Brock et al, "Smash: one shot model architecture search through hypernetworks," arXiv, Aug. 17, 2017, 21 pages.
Ciregan et al, "Multi-column deep neural networks for image classification," IEEE Xplore, Jun. 2012, 8 pages.
Cubuk et al, "Intriguing properties of adversarial examples," arXiv, Nov. 8, 2017, 17 pages.
Deng et al, "Imagenet: A large-scale hierarchical image database," IEEE Xplore, Jun. 2009, 8 pages.
DeVries et al, "Dataset augmentation in feature space," arXiv, Feb. 17, 2017, 12 pages.
Devries et al, "Improved regularization of convolutional neural networks with cutouts," arXiv, Nov. 29, 2017, 8 pages.
Elsken et al, "Simple and efficient architecture search for convolutional neural network," ICLR, arXiv, Nov. 12, 2017, 14 pages.
Fei-Fei et al, "Learning generative visual models from few training examples: an incremental bayesian approach tested on 101 object categories," CiteSeerX, Aug. 2005, 12 pages.
Fukushima et al, "Neocognitron: a self organizing neural network model for a mechanism of visual pattern recognition," Springer-Verlag, 1980, 10 pages.
Gastaldi et al, "Shake-shake regularization." arXiv, May 23, 2017, 10 pages.
Goodfellow et al, "Generative adversarial networks," arXiv, Jun. 10, 2014, 9 pages.
Han et al, "Deep pyramidal residual networks," arXiv, Sep. 6, 2017, 9 pages.
He et al, "Deep residual learning for image recognition," arXiv, Dec. 10, 2015, 12 pages.
Hochreiter et al, "Long short term memory," Neural Computation, 1997, 32 pages.
Hu et al, "Squeeze-and-excitation networks," arXiv, May 16, 2019, 13 pages.
Inoue, "Data augmentation by pairing samples for image classification," arXiv, Apr. 11, 2018, 8 pages.
Jarrett et al, "What is the best multi-stage architecture for object recognition," IEEE Xplore, 2009, 8 pages.
Kornblith et al, "Do better imagenet models transfer better?" arXiv, Jun. 17, 2019, 24 pages.
Krause et al, "Collecting a large-scale dataset of fine-grained cars," Semantic Scholar, Jun. 2015, 2 pages.
Krizhevsky et al, "ImageNet Classification with Deep Convolutional Neural Network," Jun. 2017, 9 pages.
Krizhevsky, "Learning multiple layers of features from tiny images," Semantic Scholar, Apr. 2009, 60 pages.
Kumar et al, "Parallel architecture and Hyperparameter Search via Successive Halving and Classification," arXiv, May 25, 2018, 12 pages.
Laine et al, "Temporal ensembling for semi-supervised learning," arXiv, Mar. 15, 2017, 13 pages.
LeCun et al, "Gradient-based learning applied to document recognition," IEEE Xplore, Nov. 1998, 47 pages.
Lemley et al, "Smart augmentation learning an optimal data augmentation strategy," arXiv, Mar. 24, 2017, 12 pages.
Liu et al, "Hierarchical representation for efficient architecture search," arXiv, Feb. 22, 2018, 13 pages.
Liu et al, "Progressive neural architecture search," arXiv, Jul. 26, 2018, 20 pages.
Loshchilov et al, "SGDR: Stochastic gradient descent with warm restarts," arXiv, May 3, 2017, 16 pages.
Mahajan et al, "Exploring the limits of weakly supervised pretraining," arXiv, May 2, 2018, 23 pages.
Maji et al, "Fine-grained visual classification of aircraft," arXiv, Jun. 21, 2013, 6 pages.
Mania et al, "Simple random search provides a competitive approach to reinforcement learning", arXiv, Mar. 19, 2018, 22 pages.
Miyato et al, "Virtual adversarial training: a regularization method for supervised and semi-supervised learning," arXiv, Jun. 27, 2018, 16 pages.
Mun et al, "Generative adversarial network based acoustic scene training set augmentation and selection using svm hyper-plane," In Detection and Classification of Acoustic Scenes and Events Workshop, 2017, 5 pages.
Netzer et al, "Reading digits in natural images with unsupervised feature learning," NIPS, Jan. 2011, 9 pages.
Nilsback et al, "Automated flower classification over a large number of classes," IEEE Xplore, Dec. 2008, 8 pages.
Oliver et al, Realistic evaluation of deep semi-supervised learning algorithms, arXiv, Jun. 17, 2019, 19 pages.
Perez et al, "The effectiveness of data augmentation in image classification using deep learning," arXiv, Dec. 13, 2017, 8 pages.
Pham et al, "Efficient neural architecture search via parameter sharing," arXiv, Feb. 12, 2018, 11 pages.
Real et al, "Large-scale evolution of image classifiers," arXiv, Feb. 16, 2019, 16 pages.
Real et al, "Regularized evolution for image classifier architecture search", arXiv, Feb. 16, 2019, 16 pages.
Recht et al, "Do cifar-10 classifiers generalize to cifar-10?" arXiv, arXiv, Jun. 1, 2018, 25 pages.
Sajjadi et al, "Regularization with stochastic transformations and perturbations for deep semi-supervised learning," arXiv, Jun. 14, 2016, 9 pages.
Sato et al, "APAC: Augmented pattern classification with neural networks," arXiv, May 13, 2015, 9 pages.
Schulman et al, "Proximal policy optimization algorithms," arXiv, Aug. 28, 2017, 12 pages.
Simard et al, "Best practices for convolutional neural networks applied to visual document analysis," IEEE Xplore, Aug. 2003, 6 pages.
Simonyan et al, "Very deep convolutional network for large-scale image recognition," arXiv, Apr. 10, 2015, 14 pages.
Sixt et al, "RenderGAN: Generating realistic labeled data," arXiv, Jan. 12, 2017, 15 pages.
Sutskever et al [online], "Request for Research 2.0", Jan. 21, 2018, [retrieved Jul. 26, 2019], retrieved from URL<https://openai.com/blog/requests-for-research-2/>, 5 pages.
Szegedy et al, "Going deeper with convolutions" Proceedings of the IEEE Conference on Computer Vision and Pattern Recognition, 2015, 9 pages.
Szegedy et al, "Inception-v4, inception-resnet and the impact of residual connections on learning", AAAI, 2017, 7 pages.
Tarvainen et al, "Mean teachers are better role models: Weight-averaged consistency targets improve semi-supervised deep learning results" arXiv, Dec. 2017, 16 pages.
Tran et al, "A bayesian data augmentation approach for learning deep models" Advances in Neural Information Processing Systems, 2017, 10 pages.
Wan et al, "Regularization of neural networks using drop connection" International Conference on Machine Learning, 2013, 12 pages.
Xie et al, "Aggregated residual transformations for deep neural networks" arXiv, Apr. 2017, 10 pages.

(56) References Cited

PUBLICATIONS

Xie et al, "Genetic CNN", Proceedings of IEEE Conference on Computer Vision and pattern Recognition, 2017, 10 pages.
Yamada et al, "Shakedrop regularization" arXiv, Dec. 2018, 11 pages.
Yu et al, "Deep layer aggregation" arXiv, Jul. 2017, 10 pages.
Zagoruyko et al, "Wide residual networks" arXiv, Nov. 2016, 15 pages.
Zhang et al, "mixup: Beyond empirical risk minimization" arXiv, Oct. 2017, 11 pages.
Zhong et al, "Random erasing data augmentation" arXiv, Nov. 2017, 10 pages.
Zhu et al, "Data augmentation in emotion classification using generative adversarial networks" arXIv, Dec. 2017, 14 pages.
Zoph et al, "Learning transferable architectures for scalable image recognition" arXiv, Dec. 2017, 14 pages.
Zoph et al, "Neural architecture search with reinforcement learning" arXiv, Feb. 2017, 16 pages.
PCT International Search Report and Written Opinion in International Appln. No. PCT/US2019/033091, dated Aug. 20, 2019, 13 pages.

\* cited by examiner

| Dataset | GPU hours | Best published results | Our results | |
|---|---|---|---|---|
| CIFAR-10 | 5000 | 2.1 | 1.5 | |
| CIFAR-100 | 0 | 12.2 | 10.7 | |
| SVHN | 1000 | 1.3 | 1.0 | ERROR RATE |
| Stanford Cars | 0 | 5.9 | 5.2 | |
| ImageNet | 15000 | 3.9 | 3.5 | |

| Operation Name | Description | Range of magnitudes |
|---|---|---|
| ShearX(Y) | Shear the image along the horizontal (vertical) axis with rate *magnitude*. | [-0.3,0.3] |
| TranslateX(Y) | Translate the image in the horizontal (vertical) direction by *magnitude* number of pixels. | [-150,150] |
| Rotate | Rotate the image *magnitude* degrees. | [-30,30] |
| AutoContrast | Maximize the the image contrast, by making the darkest pixel black and lightest pixel white. | |
| Invert | Invert the pixels of the image. | |
| Equalize | Equalize the image histogram. | |
| Solarize | Invert all pixels above a threshold value of *magnitude*. | [0,256] |
| Posterize | Reduce the number of bits for each pixel to *magnitude* bits. | [4,8] |
| Contrast | Control the contrast of the image. A *magnitude*=0 gives a gray image, whereas *magnitude*=1 gives the original image. | [0.1,1.9] |
| Color | Adjust the color balance of the image, in a manner similar to the controls on a colour TV set. A *magnitude*=0 gives a black & white image, whereas *magnitude*=1 gives the original image. | [0.1,1.9] |
| Brightness | Adjust the brightness of the image. A *magnitude*=0 gives a black image, whereas *magnitude*=1 gives the original image. | [0.1,1.9] |
| Sharpness | Adjust the sharpness of the image. A *magnitude*=0 gives a blurred image, whereas *magnitude*=1 gives the original image. | [0.1,1.9] |
| Cutout [2, 69] | Set a random square patch of side-length *magnitude* pixels to gray. | [0,60] |
| Sample Pairing [24, 69] | Linearly add the image with another image (selected at random from the same mini-batch) with weight *magnitude*, without changing the label. | [0, 0.4] |

FIG. 6

LEARNING DATA AUGMENTATION POLICIES

CROSS-REFERENCE TO RELATED APPLICATIONS

This application claims the benefit under 35 U.S.C. § 119(e) of U.S. Patent Application No. 62/673,777, entitled "LEARNED DATA AUGMENTATION," filed May 18, 2018. The disclosure of the foregoing application is incorporated herein by reference in its entirety for all purposes.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a training system implemented as computer programs on one or more computers in one or more locations.

According to a first aspect there is provided a method that includes receiving training data for training a machine learning model to perform a particular machine learning task. The training data includes multiple training inputs. Multiple data augmentation policies are determined, where each data augmentation policy has multiple data augmentation policy parameters that define a procedure for transforming training inputs before the training inputs are used to train a machine learning model.

At each of multiple time steps, a current data augmentation policy is generated based on quality measures of data augmentation policies generated at previous time steps. A quality measure of a data augmentation policy represents a performance of a machine learning model on a particular machine learning task as a result of training the machine learning model using the data augmentation policy. A machine learning model is trained on the training data using the current data augmentation policy. Training a machine learning model using a data augmentation policy includes: selecting a batch of training data, determining an augmented batch of training data by transforming the training inputs in the batch of training data in accordance with the data augmentation policy, and adjusting current values of the machine learning model parameters based on the augmented batch of training data. A quality measure of the current data augmentation policy is determined using the machine learning model after it has been trained using the current data augmentation policy.

A final data augmentation policy is selected based on the quality measures of the determined data augmentation policies. A final trained machine learning model is generated by training a final machine learning model using the final data augmentation policy.

In some implementations, the particular machine learning task is an image processing task including classification or regression.

In some implementations, each data augmentation policy includes one or more sub-policies. Each sub-policy includes a sequence of one or more transformation tuples, where for each transformation tuple, the data augmentation policy parameters define: (i) a transformation operation, and (ii) a magnitude of the transformation operation. Transforming the training inputs in the batch of training data in accordance with the data augmentation policy includes, for each training input: identifying a sub-policy included in the data augmentation policy; and transforming the training input in accordance with the identified sub-policy by sequentially applying each transformation tuple included in the identified sub-policy to the training input.

In some implementations, identifying a sub-policy included in the data augmentation policy for the training input includes randomly sampling a sub-policy included in the data augmentation policy.

In some implementations, applying a transformation tuple to the training input includes applying the transformation operation from the transformation tuple with the transformation operation magnitude from the transformation tuple to the training input.

In some implementations, for each transformation tuple, the data augmentation policy parameters further define a probability of applying the transformation operation; and applying a transformation tuple to the training input includes applying the transformation operation from the transformation tuple with the transformation operation magnitude from the transformation tuple to the training input with the transformation probability from the transformation tuple.

In some implementations, the machine learning model is a neural network, and adjusting the current values of the machine learning model parameters based on the augmented batch of training data includes: determining a gradient of a loss function using the augmented batch of training data; and adjusting the current values of the machine learning model parameters using the gradient.

In some implementations, generating the current data augmentation policy based on quality measures of data augmentation policies generated at previous time steps includes generating the current data augmentation policy using a policy neural network in accordance with current values of policy neural network parameters; and the policy neural network is trained by reinforcement learning techniques, and at each time step, the reinforcement learning reward signal is based on the quality measure of the current data augmentation policy at the time step.

In some implementations, for each data augmentation policy parameter, the policy network output defines a score distribution over possible values of the data augmentation policy parameter.

In some implementations, determining the current data augmentation policy from the policy network output includes sampling a value for each data augmentation policy parameter using the score distribution for the data augmentation policy parameter.

In some implementations, the policy neural network is a recurrent neural network.

In some implementations, generating a current data augmentation policy based on quality measures of data augmentation policies generated at previous time steps includes generating the current data augmentation policy using a genetic programming procedure.

In some implementations, determining the quality measure of the current data augmentation policy using the machine learning model after it has been trained using the current data augmentation policy includes: determining a performance measure of the machine learning model on a particular machine learning task using validation data comprising a plurality of training inputs; and determining the quality measure based on the performance measure.

In some implementations, the training inputs included in the validation data are not included in the training data.

In some implementations, selecting the final data augmentation policy based on the quality measures of the determined data augmentation policies includes selecting the determined data augmentation policy having the highest quality score.

In some implementations, the training inputs are images.

According to a second aspect there is provided a system including one or more computers and one or more storage devices storing instructions that when executed by the one or more computers cause the one more computers to perform operations including the operations of the first aspect.

According to a third aspect there are provided one or more computer storage media storing instructions that when executed by one or more computers cause the one more computers to perform operations including the operations of the first aspect.

Particular embodiments of the subject matter described in this specification can be implemented so as to realize one or more of the following advantages.

The training system described in this specification can train a machine learning model using a "learned" data augmentation policy, rather than a manually designed data augmentation policy. The training system can learn the data augmentation policy by automatically searching a space of possible data augmentation policies to identify a particular data augmentation policy that enables a machine learning model trained using the particular data augmentation policy to effectively perform a machine learning task.

Machine learning models trained using learned data augmentation policies may perform better (e.g., by achieving a higher prediction accuracy) than machine learning models trained using manually designed data augmentation policies. Moreover, using a learned data augmentation policy may enable a machine learning model to be trained to achieve an acceptable performance level using less training data than would otherwise be required, thus enabling more efficient use of computational resources (e.g., memory).

Data augmentation policies learned by the training system described in this specification are, in some cases, transferable between training data sets. That is, a data augmentation policy learned with reference to a first training data set can be used to effectively train a machine learning model on a second training data set (i.e., even if the data augmentation policy was not learned with reference to the second training data set). The transferability of the data augmentation policies learned by the training system can reduce consumption of computational resources, e.g., by enabling learned data augmentation policies to be re-used on new training data sets, rather than learning new data augmentation policies for the new training data sets.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 describes different types of transformation operations that can be applied to images.

Like reference numbers and designations in the various drawings indicate like elements.

DETAILED DESCRIPTION

This specification describes a training system implemented as computer programs on one or more computers in one or more locations that trains a machine learning model to perform a machine learning task using a data augmentation policy. A data augmentation policy can be used to increase the quantity and diversity of the training inputs used in training the machine learning model, thereby resulting in the trained machine learning model performing the machine learning task more effectively (e.g., with greater prediction accuracy). The training system automatically searches a space of possible data augmentation policies to identify a particular data augmentation policy, and then trains the machine learning model using the particular data augmentation policy.

Figure 1:
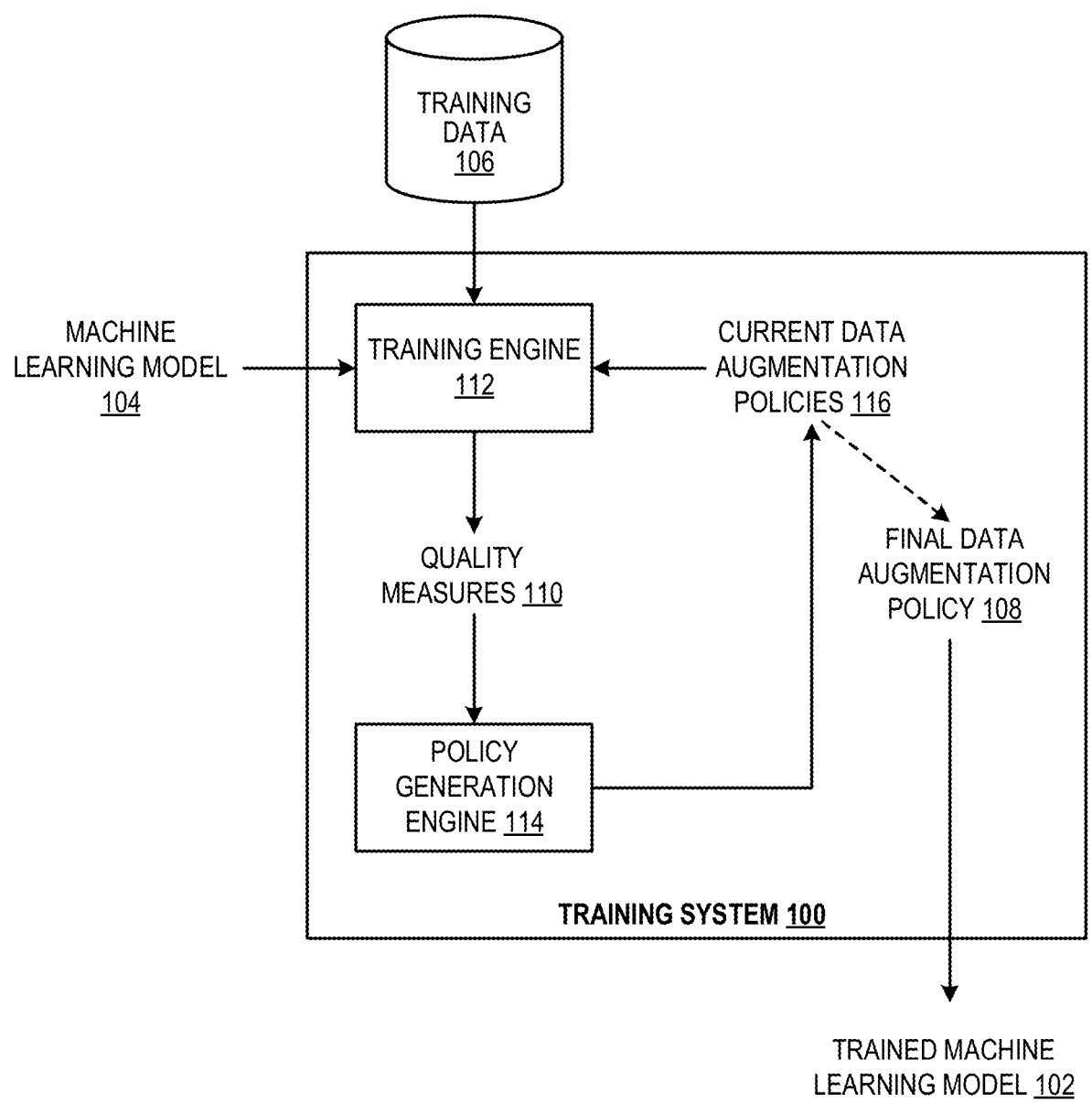
FIG. 1 shows an example training system.

FIG. 1 shows an example training system 100. The training system 100 is an example of a system implemented as computer programs on one or more computers in one or more locations, in which the systems, components, and techniques described below can be implemented.

The training system 100 is configured to generate a trained machine learning model 102 that is trained to perform a machine learning task by training a machine learning model 104 using: (i) a set of training data 106, and (ii) a "final" data augmentation policy 108. As will be described in more detail below, the training system 100 identifies the final data augmentation policy 108 by searching a space of possible data augmentation policies.

The machine learning task may involve processing an image to generate a prediction based on the image. That is, the machine learning model 104 may be configured to process an input that includes an image to generate a corresponding output, e.g., a classification output, a regression output, or a combination thereof. A few examples of machine learning tasks follow.

In one example, the machine learning model is configured to process an image to generate a classification output that includes a respective score corresponding to each of multiple categories. The score for a category indicates a likelihood that the image belongs to the category. In some cases, the categories may be classes of objects (e.g., dog, cat, person, and the like), and the image may belong to a category if it depicts an object included in the object class corresponding to the category. In some cases, the categories may represent global image properties (e.g., whether the image depicts a scene in the day or at night, or whether the image depicts a scene in the summer or the winter), and the image may belong to the category if it has the global property corresponding to the category.

In another example, the machine learning model is configured to process an image to generate a pixel-level classification output that includes, for each pixel, a respective score corresponding to each of multiple categories. For a given pixel, the score for a category indicates a likelihood that pixel belongs to the category. In some cases, the categories may be classes of objects, and a pixel may belong to a category if it is part on an object included in the object class corresponding to the category. That is, the pixel-level classification output may be semantic segmentation output.

In another example, the machine learning model is configured to process an image to generate a regression output that estimates one or more continuous variables (i.e., that can assume infinitely many possible numerical values) that characterize the image. In a particular example, the regression output may estimate the coordinates of bounding boxes that enclose respective objects depicted in the image. The coordinates of a bounding box may be defined by x-y coordinates of the vertices of the bounding box.

For convenience, this specification primarily describes the machine learning task as processing an image to generate a prediction based on the image. More generally, the machine learning task can be any task that involves processing an input to generate a prediction based on the input. A few additional examples of machine learning tasks are described next.

In one example, the machine learning task may be a speech recognition task, where the machine learning model is configured to process a representation of an audio waveform to generate an output that characterizes a sequence of phonemes, characters, or words corresponding to the audio waveform.

In another example, the machine learning task may be a video analysis task, where the machine learning model is configured to process a sequence of video frames to generate an output that characterizes the video frames, e.g., by characterizing whether the video frames depict a person performing a particular action.

In another example, the machine learning task may be a natural language processing task, where the machine learning model is configured to process a portion of text to generate an output that characterizes the portion of text, e.g., by characterizing a translation of the portion of text into a different natural language.

The training data 106 is composed of multiple training examples, where each training example specifies a training input and a corresponding target output. The training input includes an image. The target output represents the output that should be generated by the machine learning model by processing the training input. For example, the target output may be a classification output that specifies a category (e.g., object class) corresponding to the input image, or a regression output that specifies one or more continuous variables corresponding to the input image (e.g., object bounding box coordinates).

The machine learning model 104 can have any appropriate machine learning model architecture. For example, the machine learning model may be a neural network model, a random forest model, a support vector machine (SVM) model, a linear model, or a combination thereof.

The system 100 can receive the training data 106 and data defining the machine learning model 104 in any of a variety of ways. For example, the system 100 can receive training data 106 and the data defining the machine learning model 104 as an upload from a remote user of the system 100 over a data communication network, e.g., using an application programming interface (API) made available by the system 100.

A data augmentation policy is defined by a set of parameters (referred to in this document as "data augmentation policy parameters") that specify a procedure for transforming training inputs (i.e., included in training examples) before the training inputs are used to train the machine learning model. An example of a data augmentation policy and corresponding data augmentation policy parameters are described in more detail with reference to FIG. 3.

The procedure for transforming the training inputs generally includes applying one or more operations (referred to in this document as "transformation operations") to the images included in the training inputs. The operations may be any appropriate sort of image processing operations, for example, translation operations, rotation operations, shearing operations, color inversion operations, or a combination thereof. The data augmentation policy parameters may specify which transformation operations should be applied, with which magnitude, and with what probability. Examples of possible transformation operations are described in more detail with reference to FIG. 6.

The system 100 implements a search algorithm to identify data augmentation policies with high "quality measures" from a space of possible data augmentation policies. The quality measure of a data augmentation policy characterizes the performance (e.g., prediction accuracy) of a machine learning model trained using the data augmentation policy. For convenience, a higher quality measure will be understood in this document as implying a better performance (e.g., higher prediction accuracy).

The system 100 may determine the quality measure of a data augmentation policy by evaluating the performance of a machine learning model trained using the data augmentation policy on a "validation set". The validation set is composed of one of more training examples that were not used in training the machine learning model. For example, the system 100 can determine the quality measure 110 based on any appropriate performance measure of the trained machine learning model on the validation set, e.g., an F1 score or a Matthews correlation coefficient (in the case of a classification task), or a squared-error or absolute error (in the case of a regression task). For performance measures where a lower value indicates better performance of the trained machine learning model (e.g., squared-error performance measures), the quality measure of the data augmentation policy may be inversely proportional to the performance measure (i.e., so higher quality measures still imply better performance).

The system 100 can obtain the validation set, e.g., by randomly partitioning a larger set of training data to generate the training data 106 (i.e., used in training the machine learning model) and the validation set (i.e., used in evaluating the performance of the trained machine learning model).

As used throughout this document, the space of possible data augmentation policies refers to the space parameterized by the possible values of the data augmentation policy parameters.

The training system 100 includes a training engine 112 and a policy generation engine 114.

At each of multiple iterations, referred to in this specification as "time steps", the policy generation engine 114 generates one or more "current" data augmentation policies 116. For each current data augmentation policy 116, the system 100 uses the training engine 112 to train a machine learning model 104 using the current data augmentation policy and thereafter determines a quality measure 110 of the current data augmentation policy. The policy generation engine 114 uses the quality measures 110 of the current data augmentation policies 116 to improve the expected quality measures of the data augmentation policies generated for the next time step.

Training a machine learning model refers to determining trained values of the parameters of the machine learning model from initial values of the parameters of the machine learning model. The training engine 112 may train a machine learning model 104 starting from, e.g., randomly selected or default initial values of the machine learning model parameters.

Generally, a machine learning model can be trained using a data augmentation policy by transforming the training inputs of existing training examples to generate "new" training examples, and using the new training examples (instead of or in addition to the existing training examples) to train the machine learning model. For example, an image included in the training input of a training example can be transformed by applying one or more image processing operations specified by the data augmentation policy to the image.

In some cases, the training input of a training example can be transformed (e.g., in accordance with a data augmentation policy) while maintain the same corresponding target output. For example, for an image classification task where the target output specifies a type of object depicted in the training input, applying image processing operations (e.g., rotation, shearing, and the like) to the image included in the training input would not affect the type of object depicted in the image. Therefore, in this example, the transformed training input would correspond to the same target output as the original training input.

However, in certain situations, transforming the training input of a training example may also require changing the target output of the training example. In one example, the target output corresponding to a training input may specify coordinates of a bounding box that encloses an object depicted in the image of the training input. In this example, applying a translation operation to the image of the training input would require applying the same translation operation to the bounding box coordinates specified by the target output.

The specific operations performed by the training engine 112 to train the machine learning model 104 using a data augmentation policy depend on the architecture of the machine learning model 104, e.g., whether the machine learning model 104 is a neural network model or a random forest model. An example of training a neural network model using a data augmentation policy is described in more detail with reference to FIG. 7.

The policy generation engine 114 can use any of a variety of techniques to search the space of possible data augmentation policies. In one implementation, the policy generation engine 114 generates the data augmentation policies using a neural network, referred to in this document as a "policy" network. The policy network can be trained using reinforcement learning techniques, where the rewards (i.e., that the policy network is trained to maximize) are provided by the quality measures corresponding to the data augmentation policies generated by the policy neural network. An example implementation of a policy generation engine 114 that uses a policy network trained using reinforcement learning techniques is described in more detail with reference to FIG. 2.

In other implementations, the policy generation engine 114 can any of a variety of other techniques to search the space of possible data augmentation policies. For example, the policy generation engine 114 can use random search techniques, e.g., described with reference to: H. Mania, A. Guy, and B. Recht, "Simple random search provides a competitive approach to reinforcement learning", arXiv: 1803.07055v1, 2018. As another example, the policy generation engine 114 can use evolutionary search techniques (i.e., a "genetic programming procedure"), e.g., described with reference to: E. Real, A. Aggarwal, Y. Huang, and Q. V. Le: "Regularized evolution for image classifier architecture search", arXiv:1802.01548, 2018.

The system 100 may continue generating data augmentation policies until a search termination criterion is satisfied. For example, the training system 100 may determine that a search termination criterion is satisfied if data augmentation policies have been generated for a predetermined number of time steps. As another example, the training system 100 may determine that a search termination criterion is satisfied if the quality measure of a generated data augmentation policy satisfies a predetermined threshold.

After determining that a search termination criterion is satisfied, the system 100 selects the final data augmentation policy based on the respective quality measures 110 of the generated data augmentation policies. For example, the system 100 may select the data augmentation policy generated by the training system 100 with the highest quality score as the final data augmentation policy. As another example, which will be described in more detail with reference to FIG. 3, the system 100 may combine a predetermined number (e.g., 5) of data augmentation policies generated by the training system with the highest quality scores to generate the final data augmentation policy 108.

The system 100 can generate the trained machine learning model 102 by training a machine learning model 104 on the training data 106 using the final data augmentation policy 108, and thereafter output data defining the trained machine learning model 102.

In some implementations, instead of or in addition to outputting the trained machine learning model 102, the system 100 uses the trained machine learning model 102 to process requests received by users, e.g., through the API provided by the system 100. That is, the system 100 can receive inputs to be processed, use the trained machine learning model 102 to process the inputs, and provide the outputs generated by the trained machine learning model 102 or data derived from the generated outputs in response to the received inputs.

While the training system 100 determines the final data augmentation policy 108 with respect to a particular set of training data 106, the final data augmentation policy 108 may (in some cases) be transferable to other sets of training data. That is, the final data augmentation policy 108 determined with respect to the training data 106 may be used to effectively train other machine learning model on different sets of training data.

Figure 2:
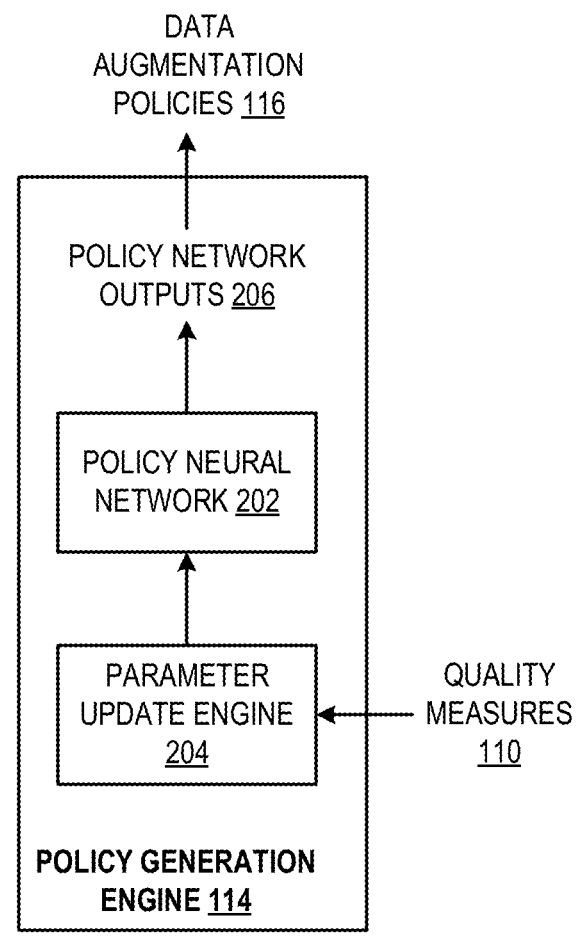
FIG. 2 shows an example policy generation engine.

FIG. 2 shows an example policy generation engine 114. The policy generation engine 114 includes a policy neural network 202 that is configured to generate policy network outputs in accordance with the parameters of the policy network 202, and a parameter update engine 204 that is configured to adjust the policy network parameter values. Each policy network output 206 generated by the policy network 202 defines a respective data augmentation policy 116.

In particular, each policy network output 206 includes a respective output at each of multiple output positions and each output position corresponds to a different data augmentation policy parameter. Thus, each policy network output includes, at each output position, a respective value of the corresponding data augmentation policy parameter. Collectively, the values of the data augmentation policy parameters specified by a given policy network output define a data augmentation policy.

At each time step, the policy generation engine 114 uses the policy network 202 to generate one or more policy network outputs 206 in accordance with the current values of the policy network parameters, each of which define a respective data augmentation policy 116.

The policy network 202 is a recurrent neural network that includes one or more recurrent neural network layers, e.g., long short-term memory (LSTM) layers or gated recurrent unit (GRU) layers. The policy network 202 generates a policy network output 206 by sequentially generating the respective data augmentation policy parameter corresponding to each output position in the sequence of output positions of the policy network output 206. In particular, for each output position, the policy network 202 receives as input the value of the data augmentation policy parameter corresponding to the preceding output position in the policy network output 206 and processes the input to update a current hidden state of the policy network 202. For the very first output position in a policy network output, because there is no preceding output position, the policy network 202 can process a pre-determined placeholder input.

The policy network 202 also includes a respective output layer for each output position in the policy network output 206. The output layer corresponding to an output position processes the updated hidden state of the policy network 202 corresponding to the output position to generate an output that defines a score distribution over possible values of the data augmentation policy parameter corresponding to the output position. For example, the output layer can first project the updated hidden state of the policy network 202 into the appropriate dimensionality for the number of possible values for the corresponding data augmentation policy parameter. Then, the output layer can apply a softmax to the projected hidden state to generate a respective score for each of multiple possible values for the corresponding data augmentation policy parameter.

For each output position, the policy network 202 generates the value for the corresponding data augmentation policy parameter by sampling from the score distribution over possible values of the data augmentation policy parameter (i.e., that is generated by the corresponding output layer). The possible values that a given data augmentation policy parameter can take are fixed prior to training and the number of possible values can be different for different data augmentation policy parameters.

Generally, the values of the policy network parameters do not change within a time step. However, by sampling the values of the data augmentation policy parameters from score distributions over possible values, the policy network 202 can generate multiple distinct policy network outputs 206 (i.e., which each correspond to a different data augmentation policy 116) at each time step.

For each data augmentation policy 116 generated at a time step, the training system 100 trains a machine learning model using the data augmentation policy 116 and thereafter determines a respective quality measure 110 of the trained machine learning model (as described earlier).

The parameter update engine 204 then uses the quality measures 110 as a reward signal to update the current values of the policy network parameters using a reinforcement learning technique. That is, the parameter update engine 204 adjusts the current values of the policy network parameters by training the policy network to generate policy network outputs that result in increased quality measures of the corresponding data augmentation policies using a reinforcement learning technique. More specifically, the parameter update engine 204 trains the policy network to generate policy network outputs that maximize a received reward that is determined based on the quality measures of the corresponding data augmentation policies. In particular, the reward for a given policy network output is a function of the quality measure of the data augmentation policy defined by the given policy network output. For example, the reward can be one of or directly proportional to one of: the quality measure, the square of the quality measure, the cube of the quality measure, the square root of the quality measure, and so on.

In some cases, the parameter update engine 204 trains the policy network 202 to maximize the expected reward using a policy gradient technique. For example, the policy gradient technique can be a REINFORCE technique or a Proximal Policy Optimization (PPO) technique. For example, at a given time step, the parameter update engine 204 updates the current values of the policy network parameters using a combination of gradients of the policy network parameters given by:

$$\frac{1}{K} \sum_{k=1}^{K} \nabla_\theta \left( \prod_{t=1}^{T} P(a_{k,t}) \right) (R_k - b) \quad (1)$$

where k indexes the policy network outputs generated at the time step, K is the total number of policy network outputs generated at the time step, t indexes the output positions in a policy network output, T is the total number of output positions in a policy network output, $\nabla_\theta$ is the gradient operator with respect to the policy network parameters, $P(a_{k,t})$ is the score corresponding to the data augmentation policy parameter generated at output position t in policy network output k, $R_k$ is the reward for policy network output k, and b is a baseline function, e.g., the exponential moving average of previous rewards.

By repeatedly updating the values of the policy network parameters, the parameter update engine 204 can train the policy network 202 to generate policy network outputs defining data augmentation policies that result in trained machine learning models that have increased performance on the machine learning task. That is, updating the values of the policy network parameters in this manner can increase the expected accuracy on the validation set of machine learning models that are trained using the data augmentation policies proposed by the policy network.

Figure 3:
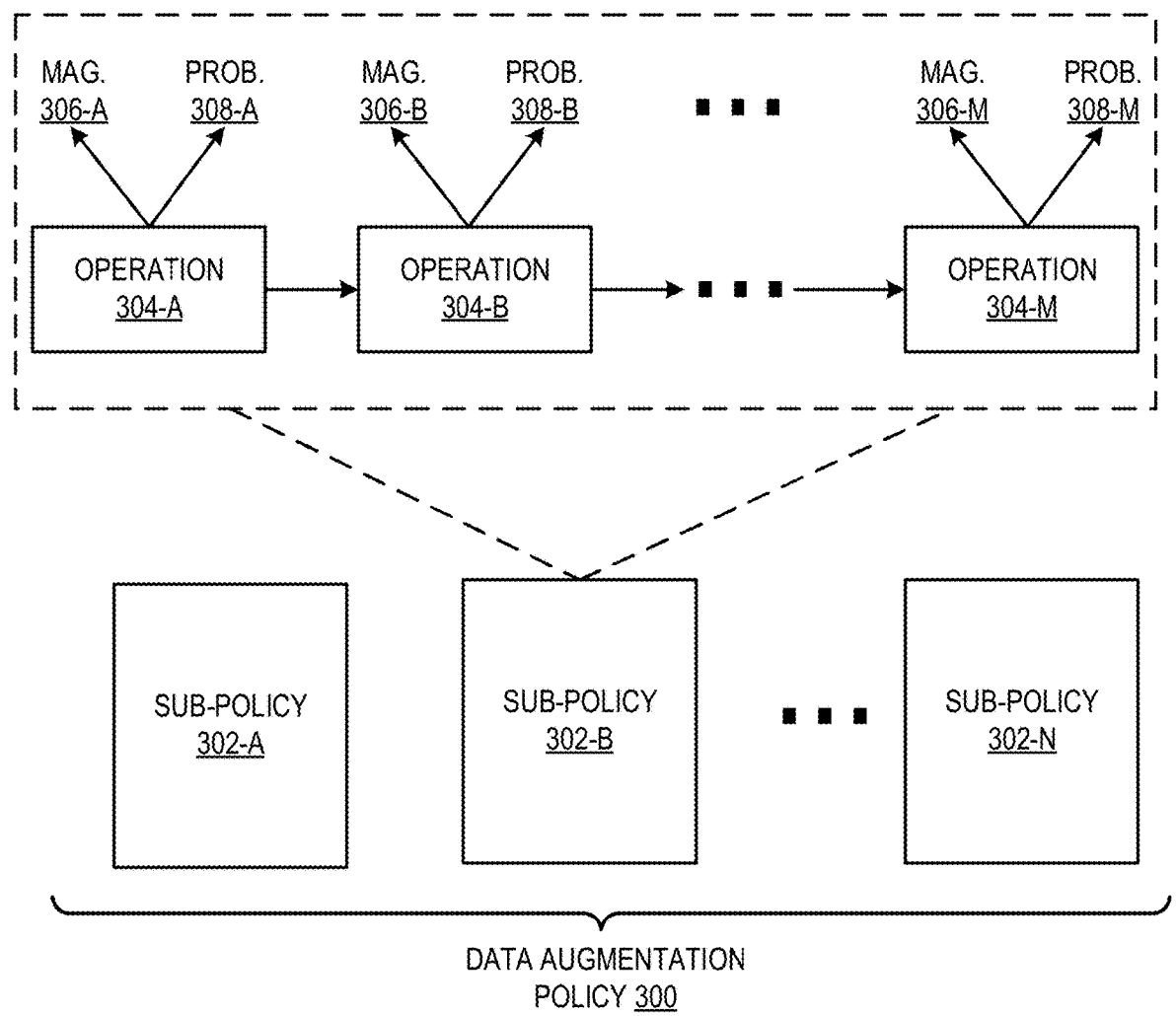
FIG. 3 is an illustration of an example data augmentation policy.

FIG. 3 is an illustration of an example data augmentation policy 300. The data augmentation policy 300 is composed of one or more "sub-policies" 302-A-302-N. Each sub-policy specifies a sequence of transformation operations (e.g., 304-A-304-M), e.g., image processing operations, e.g., translation, rotation, or shearing operations. Each transformation operation has an associated magnitude (e.g., 306-A-306-M) and an associated probability (e.g., 308-A-308-M).

The magnitude of a transformation operation is an ordered collection of one or more numerical values that specifies how the transformation operation should be applied to a training input. For example, the magnitude of a translation operation may specify the number of pixels an image should be translated in the x- and y-directions. As another example, the magnitude of a rotation operation may specify the number of radians by which an image should be rotated.

Figures 4, 5:
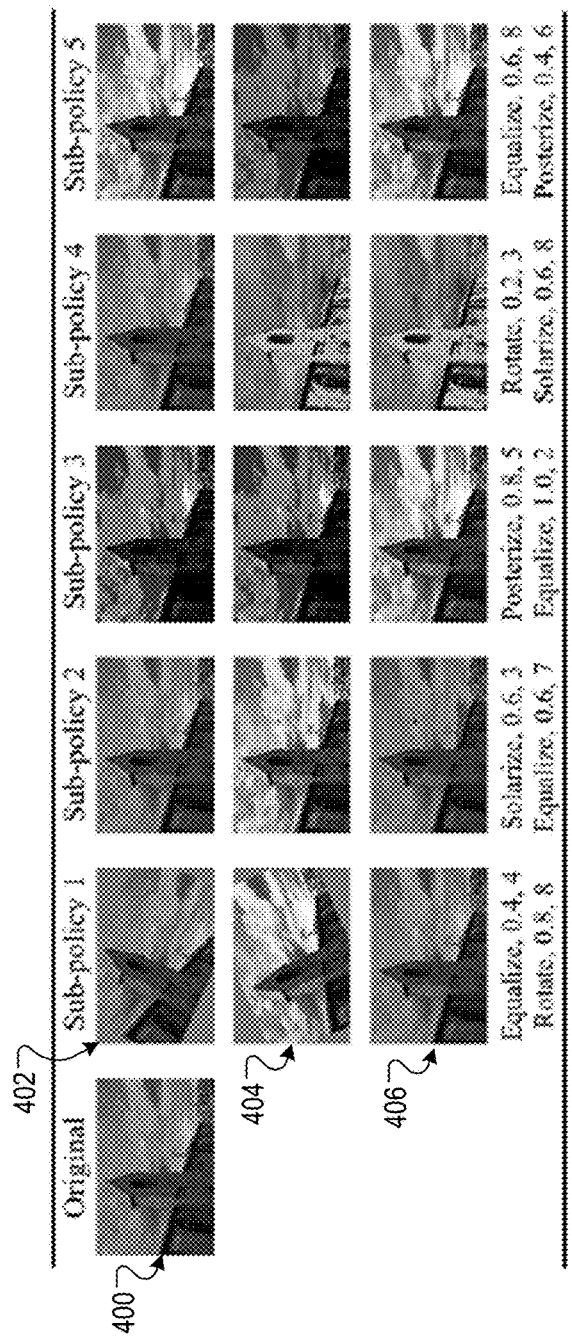
FIG. 4 is an illustration of the effects of applying different sub-policies of a data augmentation policy to an original image.
FIG. 5 shows an example of the performance gains that can be achieved by using the training system.

To transform a training input using the data augmentation policy 300, a sub-policy is selected from the set of sub-policies included in the data augmentation policy, e.g., by randomly sampling a sub-policy. Then, for each transformation operation in the sequence of transformation operations specified by the selected sub-policy, the transformation operation is applied to the training input with the probability associated with the transformation operation. If the transformation operation is applied to the training input, then it is applied with the magnitude associated with the transformation operation. The transformation operations that are applied to the training input are applied in accordance with the ordering of the transformation operations specified by the sub-policy. An illustration of the effects of applying different sub-policies to an image is shown in FIG. 4.

The parameters of the example data augmentation policy 300 include, for each transformation operation of each sub-policy: (i) the type of the transformation operation (e.g., translation, rotation, shearing, etc.), (ii) the magnitude of the transformation operation, and (ii) the probability of applying the transformation operation.

Each data augmentation policy parameter may have a predetermined set of possible values. For example, the type of a transformation operation may be selected from a predetermined set of possible transformation types. The magnitude of a transformation operation may have a predetermined number of possible values that are, e.g., uniformly spaced throughout a continuous range of allowable values. For example, for a rotation operation, the continuous range of allowable values may be $[0, 2\pi]$ radians, and the possible values of the magnitude of the rotation operation may be:

$$\left\{0, \frac{\pi}{2}, \pi, \frac{3\pi}{2}\right\}.$$

The probability of applying a transformation operation may have a predetermined number of possible values that are, e.g., uniformly spaced throughout the range $[0,1]$. In one example, the possible values of the probability of applying a transformation operation may be: $\{0, 0.2, 0.4, 0.6, 0.8, 1\}$.

A data augmentation policy may have a predetermined number of sub-policies, and each sub-policy may specify a predetermined number of transformation operations. In some cases, the probability of applying a transformation operation may be 0, resulting in the transformation operation never being applied to training inputs. Designing the space of data augmentation policies in this way can increase the diversity of data augmentation policies that are found.

In a particular example, a data augmentation policy may have 5 sub-policies, each of which specifies 2 transformation operations. Each transformation operation has respective scalar magnitude and probability values, and can be any of 16 different transformation types. In this example, the data augmentation policy would have a total of 5×2×2×16=320 parameters. If magnitude of a transformation operation has 10 possible values, and the probability of applying a transformation operation has 11 possible values, then the space of possible data augmentation policies would include approximately $2.9 \times 10^{32}$ data augmentation policies.

As described with reference to FIG. 1, the training system 100 may combine a predetermined number of data augmentation policies generated by the training system 100 with the highest quality scores to generate the final data augmentation policy. For data augmentation policies having the form described with reference to FIG. 3, multiple data augmentation policies can be combined by aggregating their respective sub-policies into a single, combined data augmentation policy. To apply the combined data augmentation policy to a training input, one of the sub-policies from the combined collection of sub-policies may be randomly selected, and the training input may be transformed in accordance with the sequence of transformation operations specified by the randomly selected sub-policy (as described earlier).

FIG. 4 is an illustration of the effects of applying different sub-policies to an original image 400. For example, "sub-policy 1" specifies a sequence of transformation operations including: (i) a equalize operation, with corresponding probability 0.4 and magnitude 4, and (ii) a rotate operation, with corresponding probability 0.8 and magnitude 8 degrees. The equalize operation and the rotate operation are described in more detail with reference to FIG. 6. The effects of applying sub-policy 1 to the original image 400 three different times are illustrated by 402, 404, and 406. FIG. 4 also illustrates the effects of applying "sub-policy 2", "sub-policy 3", "sub-policy 4", and "sub-policy 5" to the original image 400.

FIG. 5 shows an example of the performance gains that can be achieved by using the training system described in this specification. For each of multiple training data sets (i.e., "CIFAR-10", "CIFAR-100", "SVHN", "Stanford Cars", and "ImageNet"), the error rate of a neural network model trained using a data augmentation policy selected by the training system 100 (i.e., evaluated on a corresponding validation set) exceeds some of the best published results for the training data set.

FIG. 6 describes different types of transformation operations that can be applied to images. The value of one of the parameters of any given augmentation policy can define which transformation types from the set of transformation types shown in FIG. 6 is included in the given augmentation policy.

Figure 7:
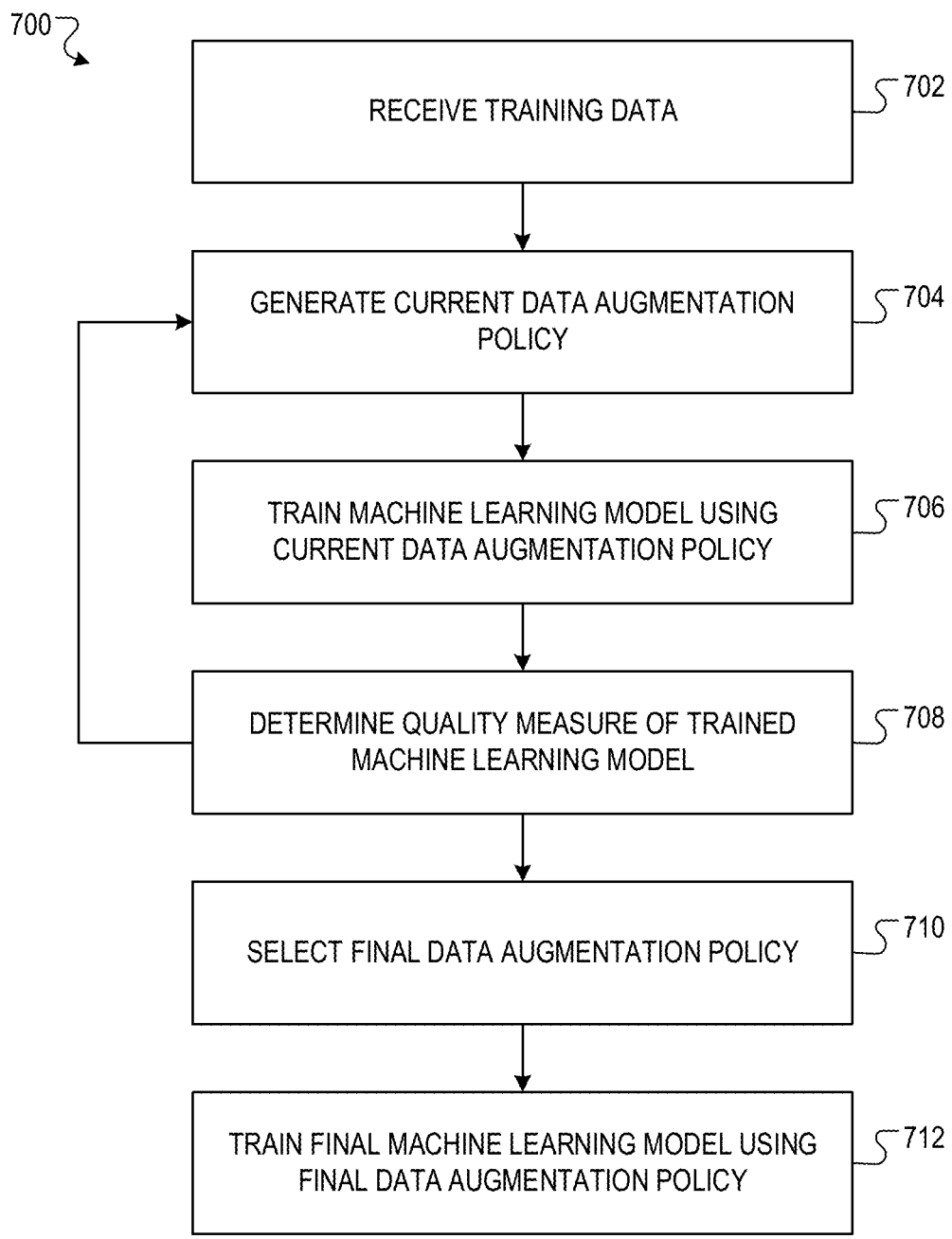
FIG. 7 is a flow diagram of an example process for automatically selecting a data augmentation policy and using the data augmentation policy to train a machine learning model.

FIG. 7 is a flow diagram of an example process 700 for automatically selecting a data augmentation policy and using the data augmentation policy to train a machine learning model. For convenience, the process 700 will be described as being performed by a system of one or more computers located in one or more locations. For example, a training system, e.g., the training system 100 of FIG. 1, appropriately programmed in accordance with this specification, can perform the process 700.

The system receives training data for training a machine learning model to perform a particular machine learning task (702). For example, the system may receive the training data through an API made available by the system. The training data includes multiple training examples, each of which specifies a training input and a corresponding target output.

The system performs the steps 704-708 of the process 700 at each of multiple time steps. For convenience, each of the steps 704-708 will be described as being performed at a "current" time step.

The system generates one or more current data augmentation policies based on quality measures of data augmentation policies generated at previous time steps (704). If the current time step is the first time step, then the system may generate the data augmentation policies in any of a variety of ways, e.g., by randomly selecting the parameter values defining each data augmentation policy. In one implementation, the system can generate the current data augmentation policies using a policy network that is trained using reinforcement learning techniques based on rewards defined by the quality measures of data augmentation policies generated at previous time steps (e.g., as described with reference to FIG. 2). In other implementations, the system can generate the current data augmentation policies using any of a variety of appropriate search techniques, e.g., random search techniques or evolutionary search techniques.

For each current data augmentation policy, the system trains a machine learning model on the training data using the current data augmentation policy (706). In one example, the machine learning model is a neural network model and the system trains the neural network model over multiple training iterations. At each training iteration, the system selects a current "batch" (i.e., set) of one or more training examples, and then determines an "augmented" batch of training examples by transforming the training inputs in the current batch of training examples using the current data augmentation policy. Optionally, the system may adjust the target outputs in the current batch of training examples to account for the transformations applied to the training inputs (as described earlier). The system processes the transformed training inputs in accordance with the current parameter values of the machine learning model to generate corresponding outputs. The system then determines gradients of an objective function that measures a similarity between: (i) the outputs generated by the machine learning model, and (ii) the target outputs specified by the training examples, and uses the gradients to adjust the current values of the machine learning model parameters. The system may determine the gradients using, e.g., a backpropagation procedure, and the system may use the gradients to adjust the current values of the machine learning model parameters using any appropriate gradient descent optimization procedure, e.g., an RMSprop or Adam procedure.

For each current data augmentation policy, the system determines a quality measure of the current data augmentation policy using the machine learning model after it has been trained using the current data augmentation policy (708). For example, the system can determine the quality measure to be a performance measure (e.g., F1 score or mean squared error) of the trained machine learning model on a set of validation data composed of multiple training examples that are not used to train the machine learning model.

The system can repeatedly perform the steps 704-708 until a search termination criterion is satisfied (e.g., if the steps 704-708 have been performed a predetermined number of times).

After the system determines that a search termination criterion is satisfied, the system selects a final data augmentation policy based on the quality measures of the data augmentation policies generated during steps 704-708 (710). For example, the system may generate the final data augmentation policy by combining a predetermined number of data augmentation policies generated during steps 704-708 that have the highest quality scores.

The system generates a final trained machine learning model by training a machine learning model on the training data using the final data augmentation policy (712). The system may provide the final trained machine learning model to a user of the system. Alternatively or in combination, the system may use the trained machine learning model to process requests received from users.

In some cases, the system may train the final machine learning model using the final data augmentation policy for a larger number of training iterations than when the system trains machine learning models using the "current" data augmentation policies generated at step 706. For example, the system may train the final machine learning model using the final data augmentation policy until a convergence criterion is satisfied, e.g., until the prediction accuracy of the final machine learning model evaluated on a validation set reaches a minimum. On the other hand, the system may train each of the current data augmentation policies generated at step 706, for a smaller (e.g., fixed) number of training iterations.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving training data for training a machine learning model to perform a particular machine learning task, the training data comprising a plurality of training inputs to the machine learning model;
determining a plurality of data augmentation policies, wherein each data augmentation policy has a plurality of data augmentation policy parameters that define a procedure for transforming training inputs before the training inputs are used to train the machine learning model, the determining comprising, at each of multiple time steps:
generating a current data augmentation policy based on, for one or more previous time steps, a quality measure of a data augmentation policy generated at the previous time step, wherein for each previous time step:
the quality measure of the data augmentation policy generated at the previous time step characterizes a performance measure of the machine learning model on a set of validation data comprising a plurality of validation inputs to the machine learning model after the machine learning model has been trained on the training data using the data augmentation policy generated at the previous time step,
wherein the machine learning model has not been trained on the validation data;
training the machine learning model on the training data using the current data augmentation policy, comprising:
selecting a batch of training inputs from the training data;
determining an augmented batch of training inputs by transforming the training inputs in the batch of training inputs in accordance with the current data augmentation policy; and
adjusting current values of parameters of the machine learning model based on the augmented batch of training inputs; and
determining the quality measure of the current data augmentation policy using the machine learning model after the machine learning model has been trained on the training data using the current data augmentation policy;
selecting a final data augmentation policy based on the quality measures of the determined data augmentation policies; and
generating a final trained machine learning model by training a final machine learning model on the training data using the final data augmentation policy.

2. The method of claim 1, wherein the particular machine learning task is an image processing task comprising classification or regression.

3. The method of claim 1, wherein:
each data augmentation policy comprises one or more sub-policies;
each sub-policy comprises a sequence of one or more transformation tuples, wherein for each transformation tuple, the data augmentation policy parameters define:
(i) a transformation operation, and (ii) a magnitude of the transformation operation; and
transforming the training inputs in the batch of training inputs in accordance with the current data augmentation policy comprises, for each training input:
identifying a sub-policy included in the data augmentation policy; and
transforming the training input in accordance with the identified sub-policy by sequentially applying each transformation tuple included in the identified sub-policy to the training input.

4. The method of claim 3, wherein identifying a sub-policy included in the data augmentation policy for the training input comprises randomly sampling a sub-policy included in the data augmentation policy.

5. The method of claim 3, wherein applying a transformation tuple to the training input comprises:
applying the transformation operation from the transformation tuple with the transformation operation magnitude from the transformation tuple to the training input.

6. The method of claim 3, wherein:
for each transformation tuple, the data augmentation policy parameters further define a probability of applying the transformation operation; and
applying a transformation tuple to the training input comprises:
applying the transformation operation from the transformation tuple with the transformation operation magnitude from the transformation tuple to the training input with the transformation probability from the transformation tuple.

7. The method of claim 1, wherein the machine learning model is a neural network, and adjusting the current values of the machine learning model parameters based on the augmented batch of training inputs comprises:
determining a gradient of a loss function using the augmented batch of training data; and
adjusting the current values of the machine learning model parameters using the gradient.

8. The method of claim 1, wherein:
generating the current data augmentation policy based on, for one or more previous time steps, the quality measure of the data augmentation policy generated at the previous time step comprises generating the current data augmentation policy using a policy neural network in accordance with current values of policy neural network parameters; and
the policy neural network is trained by reinforcement learning techniques based on a reinforcement learning reward signal, and at each time step, the reinforcement learning reward signal is based on the quality measure of the current data augmentation policy generated at the time step.

9. The method of claim 8, wherein for each data augmentation policy parameter, a policy network output of the policy neural network defines a score distribution over possible values of the data augmentation policy parameter.

10. The method of claim 9, wherein determining the current data augmentation policy from the policy network output comprises sampling a value for each data augmentation policy parameter using the score distribution for the data augmentation policy parameter.

11. The method of claim 8, wherein the policy neural network is a recurrent neural network.

12. The method of claim 1, wherein generating a current data augmentation policy comprises:
generating the current data augmentation policy using a genetic programming procedure.

13. The method of claim 1, wherein selecting the final data augmentation policy based on the quality measures of the determined data augmentation policies comprises:
selecting the determined data augmentation policy having the highest quality score.

14. The method of claim 1, wherein the training inputs are images.

15. A system comprising:
one or more computers; and
one or more storage devices communicatively coupled to the one or more computers, wherein the one or more storage devices store instructions that, when executed by the one or more computers, cause the one or more computers to perform operations comprising:
receiving training data for training a machine learning model to perform a particular machine learning task, the training data comprising a plurality of training inputs to the machine learning model;
determining a plurality of data augmentation policies, wherein each data augmentation policy has a plurality of data augmentation policy parameters that define a procedure for transforming training inputs before the training inputs are used to train the machine learning model, the determining comprising, at each of multiple time steps:
generating a current data augmentation policy based on, for one or more previous time steps, a quality measure of a data augmentation policy generated at the previous time step, wherein for each previous time step:
the quality measure of the data augmentation policy generated at the previous time step characterizes a performance measure of the machine learning model on a set of validation data comprising a plurality of validation inputs to the machine learning model after the machine learning model has been trained on the training data using the data augmentation policy generated at the previous time step,
wherein the machine learning model has not been trained on the validation data;
training the machine learning model on the training data using the current data augmentation policy, comprising:
selecting a batch of training inputs from the training data;
determining an augmented batch of training inputs by transforming the training inputs in the batch of training inputs in accordance with the current data augmentation policy; and
adjusting current values of parameters of the machine learning model based on the augmented batch of training inputs; and
determining the quality measure of the current data augmentation policy using the machine learning model after the machine learning model has been trained on the training data using the current data augmentation policy;
selecting a final data augmentation policy based on the quality measures of the determined data augmentation policies; and
generating a final trained machine learning model by training a final machine learning model on the training data using the final data augmentation policy.

16. The system of claim 15, wherein the particular machine learning task is an image processing task comprising classification or regression.

17. One or more non-transitory computer storage media storing instructions that when executed by one or more computers cause the one or more computers to perform operations comprising:
receiving training data for training a machine learning model to perform a particular machine learning task, the training data comprising a plurality of training inputs to the machine learning model;
determining a plurality of data augmentation policies, wherein each data augmentation policy has a plurality of data augmentation policy parameters that define a procedure for transforming training inputs before the training inputs are used to train the machine learning model, the determining comprising, at each of multiple time steps:
generating a current data augmentation policy based on, for one or more previous time steps, a quality measure of a data augmentation policy generated at the previous time step, wherein for each previous time step:
the quality measure of the data augmentation policy generated at the previous time step characterizes a performance measure of the machine learning model on a set of validation data comprising a plurality of validation inputs to the machine learning model after the machine learning model has been trained on the training data using the data augmentation policy generated at the previous time step,
wherein the machine learning model has not been trained on the validation data;
training the machine learning model on the training data using the current data augmentation policy, comprising:
selecting a batch of training inputs from the training data;
determining an augmented batch of training inputs by transforming the training inputs in the batch of training inputs in accordance with the current data augmentation policy; and
adjusting current values of parameters of the machine learning model based on the augmented batch of training inputs; and
determining the quality measure of the current data augmentation policy using the machine learning model after the machine learning model has been trained on the training data using the current data augmentation policy;

selecting a final data augmentation policy based on the quality measures of the determined data augmentation policies; and generating a final trained machine learning model by training a final machine learning model on the training data using the final data augmentation policy.

18. The non-transitory computer storage media of claim 17, wherein the particular machine learning task is an image processing task comprising classification or regression.

* * * * *